April 30, 1963    C. R. NYSWANER ETAL    3,087,525
LOCK NUT
Filed Oct. 27, 1960

*INVENTORS*
CHESTER R. NYSWANER
BY  WILLIAM H. TURNER

ATTORNEYS

United States Patent Office 3,087,525
Patented Apr. 30, 1963

3,087,525
LOCK NUT
Chester R. Nyswaner, R.D. 1, Box 155, and William H. Turner, Box 999, both of Clarksville, Pa.
Filed Oct. 27, 1960, Ser. No. 65,511
2 Claims. (Cl. 151—20)

This invention relates to threaded fastening devices, and more particularly, to lock nuts for securely retaining such threaded fastening devices together with a positive locking action.

In the past, various forms of lock nuts have been devised to effect a locking action. One such form employs the use of resilient projections or washer-like members which are compressed inwardly against their resiliency when the nut is tightened in position. An outward expansion force is produced between the nut and the connected member, which force resists an inadvertent loosening of the nut. This type of locking device has not been completely successful since, after several applications, the resilient members have a tendency to lose their resiliency, and accordingly the expansive holding force is materially reduced and becomes ineffective.

Another form of known lock nut relies upon a cutting or knife edge to dig into or imbed itself within the connected member when the lock nut is tightened. A frictional engagement is thereby produced with the connected member to prevent the inadvertent loosening of the lock nut. This type of nut, however, is not completely satisfactory, since the connected member is defaced and materially marred by the knife edge, and also the knife edge, itself, becomes severely worn after several applications and is rendered ineffective.

The known forms of lock nuts, such as those above enumerated, are complex in design and require special forming operations and expensive manufacturing procedures which materially add to their cost of production. We have found, on the other hand, that an extremely effective locking action may be derived by simply and inexpensively modifying a standard nut, either during its manufacture or after it is formed, without the utilization of resilient washers or knife edges on the nut.

It thus has been an object of our invention to provide an inexpensively manufacturable and highly effective improved lock nut;

Another object of our invention has been to provide an improved lock nut which may be simply and economically formed from a standard nut;

A further object of our invention has been to provide an improved lock nut which has a contact or abutment area along a side portion of its operating face to provide an offset binding or locking effect between the threads of the nut and the threads on which the nut is applied;

A still further object of our invention has been to provide an improved lock nut having an operating face with an inclined surface communicating with a planar abutment or contact surface extending solely along one side portion of the operating face, wherein contact between a stop surface and the operating face is made solely along the abutment portion of the operating face to provide a binding offset locking action between the threads of the lock nut and the threads on which it is applied;

An additional object of our invention has been to provide an improved lock nut having an operating face with a planar abutment surface extending solely along one side portion thereof wherein the planar abutment surface has a plurality of lands and grooves extending thereacross to provide a somewhat resilient, frictional-wedging locking relationship with a stop surface in which it may come in contact, and thereby lock the nut securely in place;

These and other objects of our invention will be apparent to those skilled in the art from the following disclosure and accompanying drawings in which.

Figure 1:
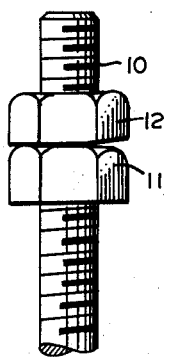
FIGURE 1 is a side elevational view of a bolt stud showing both a standard nut and an embodiment of our improved lock nut threaded thereon.
Figure 2:
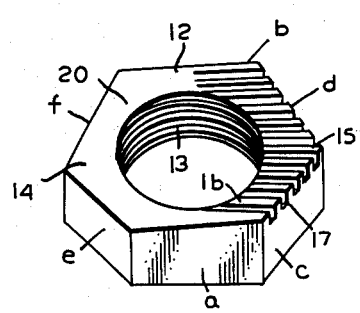
FIGURE 2 is an enlarged perspective view of a hexagonally-shaped lock nut embodying our invention.
Figure 3:
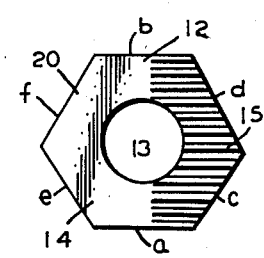
FIGURE 3 is a slightly reduced plan view of the operating face of a lock nut similar to that shown in FIGURE 2.

Referring now to the drawings, FIGURE 1 illustrates the relationship between a standard hexagonal nut and a hexagonal lock nut embodying our invention. As shown, a stud 10 of a bolt is provided with a standard hexagonal nut 11 and a hexagonal lock nut 12 in abutting contact with the standard nut 11. The lock nut 12, as shown in FIGURES 2 and 3, is internally-threaded at 13, and has an operating end face 20 comprising an inclined face or surface portion 14 (see also FIGURES 4 and 5) intersecting a planar contact or abutting surface or face portion 15 which lies substantially normal to the axis of the bore 13. The planar surface 15 is offset or off-centered with respect to the operating end face 20 and, as shown, at least extends across between adjacent side faces $c$ and $d$ and up to the side of the threaded bore 13 of the nut. The end surface portion 15 constitutes a minor portion of the operating face 20, with the inclined end surface portion 14 comprising a major portion thereof. It will be noted that the inclined portion 14, as shown, extends fully between adjacent side faces $e$ and $f$ and between opposite side faces $a$ and $b$, while end portion 15, as shown, extends fully between adjacent side faces $c$ and $d$ and may extend partially across opposite side faces $a$ and $b$. In other words, it may be said that the abutment portion 15 extends from the side wall half comprising side faces $c$, $d$ and part of $a$ and $b$ toward the side wall half comprising the remainder of the sides $a$ and $b$ and all of the sides $e$, $f$.

Figure 4:
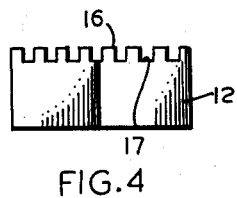
FIGURE 4 is a right side elevational view on the scale and of the lock nut shown in FIGURE 3.

As shown particularly in FIGURES 2, 3 and 4, the planar surface portion 15 may be provided with a plurality of substantially parallel spaced-apart lands 16 and grooves 17 which extend transversely thereacross and may extend slightly into the inclined face 14, for example, about half way across the operating face 20 between the side faces $a$ and $b$. It will be noted that side walls of the grooves 17 at the midportion of the planar surface portion 15 which serves as an abutment face extend in a generally radial direction.

Figure 5:
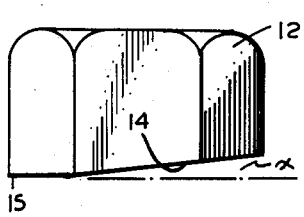
FIGURE 5 is a side elevational view on the scale and of the lock nut shown in FIGURE 2 with the operating face shown in the "down" position; to avoid confusion, lands and grooves shown in FIGURES 2 to 4 are omitted in this figure; and, FIGURE 6 is a perspective view illustrating a square lock nut embodying our invention.
Figure 6:
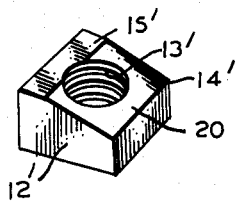

Although FIGURES 1 through 5 illustrate our improved lock nut in the form of a hexagonal nut, it will be readily apparent that our invention is not limited to hexagonal nuts, but may be utilized with virtually any size or shape of nut. In this connection, FIGURE 6 illustrates a square lock nut 12', embodying our invention. Lock nut 12' has an internally-threaded bore 13', and an operating end face 20' comprising an inclined face or surface portion 14' and a planar face or surface portion 15'. If desired, the planar surface portion 15' may be provided with lands and grooves similar to the lands and grooves 16 and 17 shown in FIGURES 2 through 4.

As will be noted in FIGURE 1, the planar surface portion 15 of the lock nut provides the sole contact or abutting surface of the operating face when the nut is tightened against an adjacent surface. As previously mentioned, the planar surface 15 is not centrally positioned on the operating face of the nut, but rather it lies solely to one side of a longitudinal plane containing the axis of the bore 13, and extends between a line substantially tangential to an edge of the threaded bore 13 outwardly toward adjacent side edges of the nut. We have found that by providing a single offset contact or abutting surface on the nut for engagement with a stopping surface against which it is to abut, an extremely effective locking force is produced between the threads of the nut and the threads of the bolt or shaft on which the nut is applied. Further, this locking action is accomplished with the utilization of standard screw threads on both the nut and bolt, and without permanently distorting either of these threads.

When our improved lock nut encounters a stopping surface, such as the end face of the nut 11 of FIGURE 1, only the off-centered planar surface portion 15 forms the initial contact with such stopping surface. As the nut is tightened against the stopping surface, the off-centered abutment surface produces a binding or offset locking action between the threads of the lock nut and the threads of the shaft on which the nut is applied. This locking action is accomplished by the abutment surface portion prohibiting relative movement between the threads along that side of the nut having the off-centered surface portion 15, while permitting limited movement between the threads of the nut and the threads of the shaft along that side of the nut having the cut-away or inclined surface portion 14. In other words, the lock nut has a tendency to bind or cock on the stand or shaft 10 to which it is applied, thereby producing an offset binding or locking action. In fact, this binding force is so effective, that if a virtually permanent connection is desired, it is possible to forcibly tighten down the lock nut so that the inclined surface portion 14 contacts the stopping surface causing the shaft 10 to bend within its elastic limits.

The above-described thread-binding action not only provides positive locking for nuts up to 3/8 inch under virtually all conditions, but also for larger nuts utilized under normal conditions. However, where such larger nuts are subjected to jarring or vibration, such as in heavy machinery, automobile, and railroad usage, a greater locking force may be desirable. We have found that by providing the planar surface of the nut with a plurality of resilient-holding lands, greatly improved locking characteristics are obtainable, wherein large nuts may be securely maintained in a locked position even when subjected to severe jolts and vibration.

When a lock nut provided with the lands and grooves is tightened against a stop surface, the lands tend to flatten or bend over in a direction opposite to the rotation of the nut. However, it is important that the lands are not stressed beyond the elastic limit of the metal, so that they will return to their normal upright position after the nut has been loosened. Accordingly, when the grooves are cut into the planar surface to form the lands, they should not be too deep or the lands will be too flexible and will not return to their normal position. We have found that a groove depth of about 1/16 of an inch provides satisfactory results for 1/2 to 1 inch nuts.

In order to release a lock nut provided with lands and grooves, it is necessary to forcibly rotate the nut in the direction of the deformed lands. Since the inwardly-deformed lands exert an outward force against the stopping surface, the nut must be forcibly backed-off until the compression exerted by the lands is released and they have returned to their normal position. That is to say, when the nut is loosened the lands will again flex outwardly and provide a high spot which must forcibly be overcome before the nut may be freely backed-off.

The amount of recession or cut-back of the inclined or cut-away surface portion 14, 14' from the planar surface portion 15, 15' should be sufficient to adequately provide for the desired offset binding action between the thread portions. In FIGURE 5, $x$ indicates the amount of cut or maximum depth distance between the face of the inclined surface portion and the planar surface portion. We have found that to provide an effective binding-locking action between the threads, the amount of cut or distance $x$ represented in FIGURE 5, should be about that indicated in the following table.

| Nut | Cut |
| --- | --- |
| 1" | 3/16" |
| 7/8" | 1/8" |
| 3/4" | 1/8" |
| 5/8" | 1/8" |
| 1/2" | 3/32" |
| 3/8" | 1/16" |

Although we have disclosed our invention in the form of hexagonal and square lock nuts, it will be readily apparent to those skilled in the art that the invention is not limited to these two forms of nuts and that other variations and modifications may be made to the disclosed invention without departing from the spirit and scope thereof as defined in the appended claims.

What we claim is:

1. An improved discrete lock nut body for forward and backward rotation on a threaded stem into and out of a tight-vibration-resistant locking engagement with a transverse substantially planar end abutment surface having an area at least equal to the transverse area of said body, said body having substantially planar vertical side walls defining vertical corners therebetween, a substantially planar transverse outer end wall, a threaded bore extending centrally through said body normal to said planar outer end wall, an opposed transverse inner end operating wall to be moved into and out of a tight compression-locking engagement with respect to the planar end abutment surface by a forward rotation of said body on the threaded stem, said inner end operating wall having a planar abutment face portion substantially normal to said threaded bore and extending transversely from one side wall half of said body towards an opposite side wall half thereof immediately to and partially along opposite sides of said threaded bore, said inner end operating wall having a transverse offset face portion declining from said abutment face portion toward said outer end wall and extending to said opposite side wall half of said body, so that said body will be cocked on the threaded stem by compression-abutment of said abutment face portion with the planar end abutment surface when said body is rotated forwardly on the threaded stem into tight engagement therewith, alternate grooves and lands formed in and extending continuously transversely fully-across said abutment face portion between the one side wall half of said body immediately to and partially along opposite sides of said threaded bore, said lands being defined by said grooves and having substantially planar side walls that are normally in substantially parallel positions to a plane containing the axis of said threaded bore and to each other, said side walls of said grooves at the midportion of said abutment face portion extending in a generally radial direction, said lands and grooves being substantially of equal cross sectional area, said area being of such a size as to permit the lands to be flexible and adapted to deform within their elastic limits from their normal substantially parallel positions to backwardly-bent positions within said grooves when said body is tightened-down on said planar abutment face portion by forwardly-rotating it on the threaded stem.

2. An improved discrete lock nut body as defined in claim 1 wherein said grooves and lands extend slightly into said offset face portion.

References Cited in the file of this patent

UNITED STATES PATENTS

| | | |
|---|---|---|
| 1,832,060 | Strid | Nov. 27, 1931 |

FOREIGN PATENTS

| | | |
|---|---|---|
| 26,143 | England | Nov. 19, 1896 |
| 258,495 | England | Sept. 23, 1926 |
| 109,074 | Sweden | Nov. 16, 1943 |